United States Patent
Yang

(10) Patent No.: US 11,294,245 B2
(45) Date of Patent: Apr. 5, 2022

(54) DISPLAY PANEL, MANUFACTURING METHOD THEREFOR, AND DISPLAY DEVICE

(71) Applicant: HKC CORPORATION LIMITED, Shenzhen (CN)

(72) Inventor: Chunhui Yang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 539 days.

(21) Appl. No.: 16/327,312

(22) PCT Filed: Nov. 29, 2018

(86) PCT No.: PCT/CN2018/118160
§ 371 (c)(1),
(2) Date: Feb. 21, 2019

(87) PCT Pub. No.: WO2020/093488
PCT Pub. Date: May 14, 2020

(65) Prior Publication Data
US 2021/0349356 A1    Nov. 11, 2021

(30) Foreign Application Priority Data
Nov. 9, 2018 (CN) .......................... 201811332878.X

(51) Int. Cl.
*G02F 1/1333* (2006.01)
*G02F 1/1343* (2006.01)
*G02F 1/1362* (2006.01)

(52) U.S. Cl.
CPC .. *G02F 1/134309* (2013.01); *G02F 1/133345* (2013.01); *G02F 1/136286* (2013.01); *G02F 1/136295* (2021.01)

(58) Field of Classification Search
None
See application file for complete search history.

(56) References Cited

U.S. PATENT DOCUMENTS

| 9,927,661 B2 | 3/2018 | Park et al. |
| 2011/0090445 A1* | 4/2011 | Kim ................ G02F 1/1339 349/139 |

(Continued)

FOREIGN PATENT DOCUMENTS

| CN | 101676776 A | 3/2010 |
| CN | 202583650 U | 12/2012 |

(Continued)

OTHER PUBLICATIONS

International Search Report issued in corresponding International application No. PCT/CN2018/118160, dated Aug. 15, 2019 (6 pages).

(Continued)

*Primary Examiner* — James A Dudek

(57) ABSTRACT

This application discloses a display panel, a manufacturing method therefor, and a display device. The display panel is divided into a display area and a non-display area, and the display panel includes a first substrate, a second substrate and an AU ball; the first substrate includes a transparent electrode layer and a common line, and the second substrate includes a common electrode; the common line and the common electrode are connected to each other through the AU ball; the common line includes a transfer plate, the transfer plate is arranged at a position corresponding to the AU ball, the transparent electrode layer and the transfer plate are in contact with and connected to each other, the transfer plate is connected to the AU ball through the transparent electrode layer, and a covering area of the transparent electrode layer is greater than a covering area of the transfer plate.

15 Claims, 7 Drawing Sheets

(56) References Cited

U.S. PATENT DOCUMENTS

| | | | | |
|---|---|---|---|---|
| 2011/0134352 A1* | 6/2011 | Nakagawa | ............ | G02F 1/1339 349/43 |
| 2016/0343741 A1* | 11/2016 | Liu | ...................... | G09G 3/3655 |
| 2017/0097533 A1* | 4/2017 | Park | ...................... | G02F 1/1337 |
| 2021/0231989 A1* | 7/2021 | Yang | ...................... | G02F 1/1339 |

FOREIGN PATENT DOCUMENTS

| | | |
|---|---|---|
| CN | 104062816 A | 9/2014 |
| CN | 104503131 A | 4/2015 |
| CN | 105093759 A | 11/2015 |

OTHER PUBLICATIONS

First Office Action from China patent office in a counterpart Chinese patent Application 201811332878.X, dated Mar. 19, 2020 (8 pages).
Written Opinion of the International Searching Authority for No. PCT/CN2018/118160.

\* cited by examiner

DISPLAY PANEL, MANUFACTURING METHOD THEREFOR, AND DISPLAY DEVICE

This application claims the priority to the Chinese Patent Application No. CN201811332878.X, filed with National Intellectual Property Administration, PRC on Nov. 9, 2018 and entitled "DISPLAY PANEL, MANUFACTURING METHOD THEREFOR, AND DISPLAY DEVICE", which is incorporated herein by reference in its entirety.

TECHNICAL FIELD

This application relates to the technical field of display, and more particularly relates to a display panel, a manufacturing method therefor, and a display device.

BACKGROUND

The description herein provides only background information related to this application, but does not necessarily constitute the existing technology.

Display panels include thin film transistor-liquid crystal displays (TFT-LCDs). A manufacture procedure of a TFT-LCD includes preparation of an array substrate, preparation of a color filter substrate, and a liquid crystal cell process. The liquid crystal cell process is completed in a manner that the liquid crystal cell process is transferred by the array substrate and the color filter substrate together after the array substrate and the color filter substrate are manufactured. In the liquid crystal cell process, in addition to various cleaning processes, a main process manufacture procedure includes coating of a liquid crystal oriented layer, liquid crystal instilling, seal coating (essential AU ball coating), vacuum assemblage of the cell process, cutting and the like.

During vacuum assemblage of the cell process and AU ball coating, errors exist, and then transmission of an electric potential between the color filter substrate and the array substrate is affected.

SUMMARY

This application provides a display panel improving display quality, a manufacturing method therefor, and a display device.

In order to achieve the foregoing objectives, this application provides the display panel, the display panel is divided into a display area and a non-display area, and includes a first substrate, a second substrate arranged opposite to the first substrate, and an AU ball, and the AU ball is arranged between the first substrate and the second substrate; the first substrate includes a transparent electrode layer and a common line, and the second substrate includes a common electrode; the AU ball is arranged in the non-display area of the display panel, and the common line of the first substrate and the common electrode of the second substrate are connected to each other through the AU ball; and the common line includes a transfer plate, the transfer plate is arranged at a position corresponding to the AU ball, the transparent electrode layer and the transfer plate are in contact with and connected to each other, the transfer plate is connected to the AU ball through the transparent electrode layer, and a covering area of the transparent electrode layer is greater than a covering area of the transfer plate.

Optionally, the common line further includes a common line wire, the common line wire is hollow in a latticed shape, the common line wire communicates with the transfer plate, and the transparent electrode layer covers the transfer plate and partially covers the common line wire on a periphery of the transfer plate.

Optionally, the first substrate includes a first metal layer, and the first metal layer and the common line are arranged in a same layer.

Optionally, the first substrate is further provided with a first signal line, a signal of the common line is different from that of the first signal line, and the transparent electrode layer covers an area corresponding to the first signal line; and the first substrate is further provided with an insulating layer, and the insulating layer is arranged between the first signal line and the transparent electrode layer.

Optionally, the common line of the first substrate is formed on the first metal layer of the first substrate, the insulating layer includes a first insulating layer and a passivation layer, the first insulating layer is arranged on the first metal layer, and the passivation layer is arranged on the insulating layer.

Optionally, at the position corresponding to the AU ball, the first insulating layer and the passivation layer form a same pattern shape through a same mask manufacture procedure.

Optionally, the insulating layer is arranged between the first signal line and the transparent electrode layer, and the transparent electrode layer corresponding to a common line area is directly attached to the transfer plate.

Optionally, the first metal layer includes a common line and a first signal line, the common line and the first signal line transmit different signals, the transparent electrode layer does not cover an area corresponding to the first signal line, in a direction from the common line to the first signal line, a width, protruding out of the transfer plate, of the transparent electrode layer is d, an interval between the first signal line and the common line is w, and w<d.

Optionally, in glia direction from the common line to the first signal line, a width, protruding out of one side of the transfer plate, of the transparent electrode layer is d1, and a width, protruding out of the other side of the transfer plate, of the transparent electrode layer is d4; in a direction perpendicular to the direction from the common line to the first signal line, a width, protruding out of one side of the transfer plate, of the transparent electrode layer is d2, a width, protruding out of the other side of the transfer plate, of the transparent electrode layer is d3, and d1=d4<d2=d3.

This application further discloses a manufacturing method of a display panel, comprising the following steps:

forming a first substrate;

forming a second substrate, wherein a common electrode is formed on the second substrate; and arranging the formed second substrate and the formed first substrate, so that the first substrate and the second substrate are in contact with and connected to each other through an AU ball arranged in a non-display area of the display panel.

The step of forming the first substrate includes the following steps:

forming a common line and a transfer plate of the common line, the transfer plate being arranged at a position corresponding to the AU ball; and forming a transparent electrode layer, so that the formed transparent electrode layer and the formed transfer plate are in contact with and connected to each other, and the transfer plate of the common line is connected to the AU ball through the transparent electrode layer, a covering area of the formed transparent electrode layer being greater than a covering area of the transfer plate.

This application further discloses a display device, comprising the display panel as mentioned above.

Compared with a solution that in arrangement of a transparent electrode layer, a covering area of the transparent electrode layer is equal to a covering area of a transfer plate, a covering area of the transparent electrode layer of this application is greater than a covering area of the transfer plate, even though a position of an AU ball deviates because of various errors, as the covering area of the transparent electrode layer is greater, connection between a common line of the first substrate and the common electrode of the second substrate is not affected, and display quality of the display panel is improved.

BRIEF DESCRIPTION OF DRAWINGS

The accompanying drawings included are used for helping understand the embodiments of this application, constitute a part of this specification, illustrate examples of the embodiments of this application and, together with the description, serve to explain the principles of this application. Apparently, the accompanying drawings in the following description merely show some embodiments of this application, and persons of ordinary skill in the art may still derive other drawings from these accompanying drawings without creative effort. In the figures.

DETAILED DESCRIPTION

Figure 1:
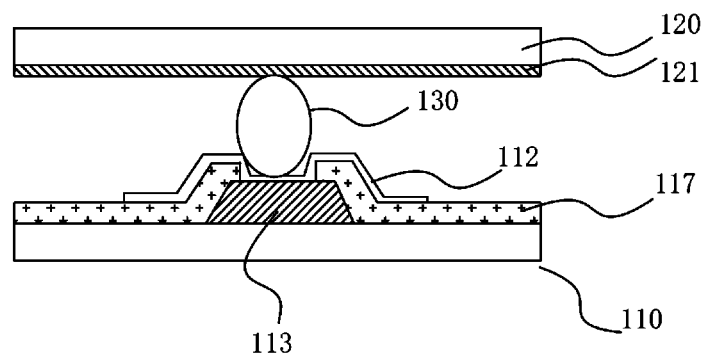
FIG. 1 is a schematic view of a structure of a display panel according to an embodiment of this application.

It should be understood that the terms used herein, specific structures and functional details disclosed herein are merely representative, and are intended to describe specific embodiments. However, this application may be specifically implemented in many alternative forms, and should not be construed as being limited to the embodiments set forth herein.

In the description of this application, the terms such as "first" and "second" are used only for the purpose of description, and should not be understood as indicating the relative importance or implicitly specifying the number of the indicated technical features. Therefore, unless otherwise stated, a feature defined by "first" or "second" can explicitly or implicitly include one or more of said features, and "a plurality of" means two or more than two. The terms "include", "comprise" and any variant thereof are intended to cover non-exclusive inclusion, and do not preclude the presence or addition of one or more other features, integers, steps, operations, elements, components, and/or combinations thereof.

In addition, orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating that the mentioned apparatus or component must have a particular orientation or must be constructed and operated in a particular orientation. Therefore, such terms should not be construed as limiting of this application.

In addition, unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

An AU ball coating process is used in products in display modes of twisted nematic (TN) panels and a vertical alignment (VA) technology, and aims to transmit a common (COM) line voltage of a TFT substrate to a transparent conducting film (ITO) of a color filter (CF) substrate. A position of AU ball coating is on an outer side of a seal, a COM line of the TFT substrate is led out through a contact hole, and coated with the AU ball, then a COM electric potential is transmitted to the CF substrate using conductive capacity of the AU ball. A pattern, on a corresponding TFT substrate, of AU ball coating is defined as a transfer pad. During actual design of layout of the thin film transistor (TFT) substrate, a layout space is limited and consequently design of a transfer pad size is limited. An assemblage error exists during assemblage of a liquid crystal cell, a coating error exists during AU ball coating, and the transfer pad size is limited, which all generate adverse effects on transmission of the COM voltage of the TFT substrate to an ITO electrode. The transfer pad size is only designed according to a design of an actual product, changeability is small, and how to eliminate the coating error and the assemblage error is directly related to COM voltage transmission. That is, a hole is dry-etched in a gate insulating layer (GI) and a passivation layer (PV) on a first metal layer (Metal1, M1), and then is coated with the transparent conducting film ITO.

This application is illustrated hereinafter with reference to the accompanying drawings and optional embodiments.

As shown from FIG. 1 to FIG. 12, in an embodiment of, as shown in FIG. 1, this application discloses a display panel 100, divided into a display area and a non-display area, and the display panel 100 includes a first substrate 110, a second substrate 120 arranged opposite to the first substrate 110, and an AU ball 130; the first substrate 110 includes a transparent electrode layer 112 and a common line 113, and the second substrate 120 includes a common electrode 121; the AU ball 130 is arranged in the non-display area of the display panel 100, and the common line 113 of the first substrate 110 and the common electrode 121 of the second substrate 120 are connected to each other through the AU ball 130. The common line 113 includes a transfer plate 114, the transfer plate 114 is arranged at a position corresponding to the AU ball 130, the transparent electrode layer 112 and the transfer plate 114 are in contact with and connected to each other, the transfer plate 114 is connected to the AU ball 130 through the transparent electrode layer 112, and a covering area of the transparent electrode layer 112 is greater than a covering area of the transfer plate 114.

The first substrate 110 includes the transparent electrode layer 112 and the common line 113, the common line 113 includes the transfer plate 114, the transparent electrode layer 112 and the transfer plate 114 are in contact with and connected to each other, and the transfer plate 114 is connected to the AU ball 130 through the transparent electrode layer 112, and is connected to the common electrode 121 of the second substrate 120 through the AU ball 130. Arrangement of the transparent electrode layer 112 determines whether normal connection is achieved between the transfer plate 114 and the AU ball 130, and determines whether normal connection is achieved between the common line 113 of the first substrate 110 and the common electrode 121 of the second substrate 120.

Figure 2:
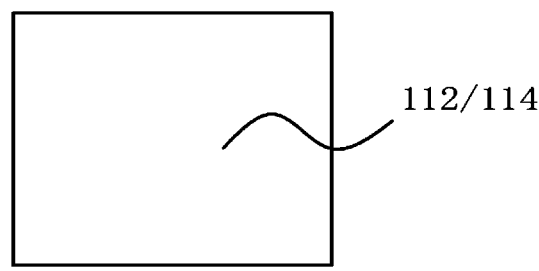
FIG. 2 is a schematic view of a top view of a display panel according to an embodiment of this application.

Compared with a solution as shown in FIG. 2, arrangement of the transparent electrode layer 112 makes the covering area of the transparent electrode layer 112 equal to the covering area of the transfer plate 114. However, due to the fact errors exist in a process manufacture procedure, for example, an error exists when the first substrate 110 and the second substrate 120 are opposed and aligned, and is called the assemblage error; during coating of the AU ball 130, an error exists and is called the coating error; meanwhile, other errors also exist. These errors affect the contact between the AU ball 130 and the transparent electrode layer 112, causing poor contact, and connection of the common line 113 of the first substrate 110 and the common electrode 121 of the second substrate 120 is affected. In the solution, the covering area of the transparent electrode layer 112 is greater than the area of the transfer plate 114, even though a position of the AU ball 130 deviates because of the various errors, as the covering area of the transparent electrode layer 112 is greater, connection between the common line 113 of the first substrate 110 and the common electrode 121 of the second substrate 120 is not affected, and display quality of the display panel 100 is improved.

Figure 3:
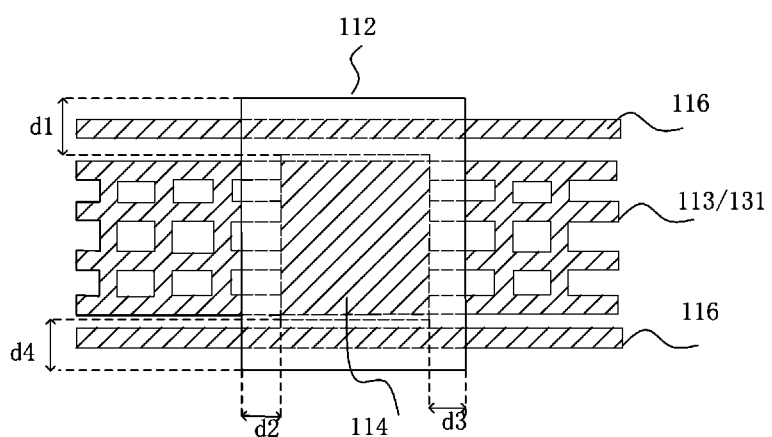
FIG. 3 is a schematic view of a top view of a first metal layer according to an embodiment of this application.

As shown in FIG. 3, in one embodiment, the common line further includes a common line wire 131, the common line wire 131 is hollow in a latticed shape, the common line wire 131 communicates with the transfer plate, and the transparent electrode layer 112 covers the transfer plate and partially covers the common line wire 131 on a periphery of the transfer plate.

In the solution, the common line further includes the common line wire 131 hollow in the latticed shape, the common line wire 131 communicates with the transfer plate, and the transparent electrode layer 112 covers the transfer plate and the common line wire 131 on the periphery of the transfer plate, and therefore the covering area of the transparent electrode layer 112 becomes greater. When the errors exist, an area, in contact with the transparent electrode layer 112, of the AU ball is decreased, the transparent electrode layer 112 covers the transfer plate and the common line wire 131 on the periphery of the transfer plate, the contact area is increased relative to a solution that the transparent electrode layer 112 only covers an area of the transfer plate, and therefore influences on connection of the common line of the first substrate and the common electrode of the second substrate are little.

In one embodiment, the first substrate 110 includes a first metal layer 115, and the first metal layer 115 and the common line 113 are located in a same layer. In the solution, the common line 113 of the first substrate 110 and the first metal layer 115 are arranged in the same layer, a signal of the display area is in direct connection with the common line 113, arrangement of other wires is not needed, layout is reduced, and cost is saved. In addition, the common line 113 of the first substrate 110 and the first metal layer 115 are arranged in the same layer and formed in the same layer, and are formed through a same mask manufacture procedure, masks are reduced, and production efficiency is improved.

Of course, the common line 113 and the first metal layer 115 may also be arranged in different layers, and the common line 113 may also be on a second metal layer. When the common line 113 is arranged on the second metal layer, an effect of connection of the AU ball 130 may also be achieved. Of course, the common line 113 may also be on the first metal layer 115 and the second metal layer at the same time, when the first metal layer 115 and the second metal layer form the common line 113 at the same time, the common line is of a double-layer structure, an overall thickness of metal is increased, a resistance value of a resistor is decreased, and signal transmission is facilitated. A setting position of the common line 113 is not defined as long as the common line 113 is arranged on the metal layers.

As shown in FIG. 3, in one embodiment, a first signal line 116 is further arranged on the first substrate, a signal of the common line 113 is different from that of the first signal line 116, and the transparent electrode layer 112 covers an area corresponding to the first signal line 116, and the first signal line is formed on the first metal layer, and is in a same layer. The first substrate 110 is further provided with an insulating layer 117, and the insulating layer 117 is arranged between the first signal line 116 and the transparent electrode layer 112.

In the solution, the first metal layer 115 includes the common line 113, the signal of the common line 113 is different from that of the first signal line 116, and the transparent electrode layer 112 corresponding to the area of the first signal line 116 is arranged on the insulating layer 117. During opposing, as the transparent electrode layer 112 corresponding to the area of the first signal line 116 is arranged on the insulating layer 117, the AU ball 130 is pressed on the transfer pad, and even though the transparent electrode layer 112 (ITO) is pressed through, the insulating layer can still play a role of blocking, the insulating layer 117 can counteract part of pressure of the AU ball 130, it is prevented that the insulating layer 117 is pressed through, then it is prevented that the transparent electrode layer 112 is connected to a corresponding metal layer, and due to the fact that the signals are different, crosstalk of the signals is caused after connection. Thus, the transparent electrode layer 112 corresponding to the area of the first signal line 116 is arranged on the insulating layer 117, the insulating layer 117 may play a protective role, and it is prevented that signal connection of the transparent electrode layer 112 and the first signal line 116 causes crosstalk of the signals.

Figure 4:
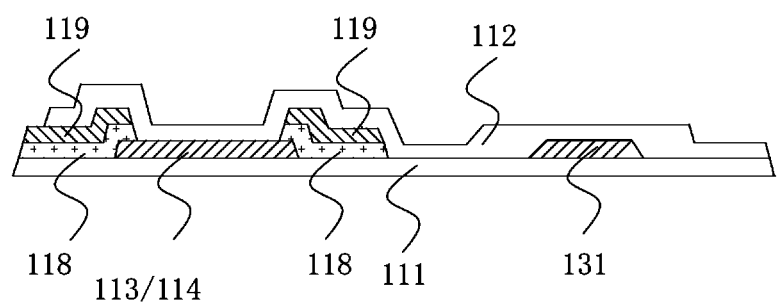
FIG. 4 is a schematic view of a sectional view of the first metal layer according to an embodiment of this application.

As shown in FIG. 4, in one embodiment, the common line of the first substrate is formed on the first metal layer of the first substrate. The insulating layer 117 includes a first insulating layer 118 and a passivation layer (PV) 119, the first insulating layer 118 is arranged on the first metal layer 115, and the passivation layer 119 is arranged on the first insulating layer 118. In the solution, the insulating layer 117 includes the two layers, i.e., the first insulating layer 118 and the passivation layer 119, compared with a solution that only one insulating layer 117 is arranged, the overall thickness is increased by layer number increasing, and a possibility that the insulating layer 117 is pressed through by the AU ball 130 is lowered. Thus, crosstalk of the signals may be well prevented, and quality of the display panel 100 is improved.

Of course, the insulating layer 117 may be of a one-layer structure of the first insulating layer 118 or the passivation layer 119, when only one layer of structure exists, a protective role may also be played, crosstalk between different signals is prevented, and arrangement of the insulating layer 117 only requires that an insulating effect can be achieved with the transparent electrode layer 112.

As shown in FIG. 4, in one embodiment, at the position corresponding to the AU ball, the first insulating layer 118 and the passivation layer 119 form a same pattern shape through a same mask manufacture procedure. In the solution, the first insulating layer 118 and the passivation layer 119 are formed through a same mask manufacture procedure, the number of masks and time are saved, the production efficiency is improved, and the production cost is reduced. Of course, the first insulating layer 118 and the passivation layer 119 may also be formed without using a same mask manufacture procedure, the first insulating layer 118 and the passivation layer 119 may be separately formed by using different masks, and it is only needed that two layers serve as the insulating layer 117. In addition, when the first insulating layer 118 and the passivation layer 119 are formed through the same mask manufacture procedure, patterns formed by the first insulating layer 118 and the passivation layer 119 may also be different, and a size of a hole formed by the first insulating layer 118 may be different from that of a hole formed by the passivation layer 119.

In a direction from the common line to the first signal line, a width, protruding out of one side of the transfer plate, of the transparent electrode layer 112 is d1, and a width, protruding out of the other side of the transfer plate, of the transparent electrode layer 112 is d4; and in a direction perpendicular to the direction from the common line to the first signal line, a width, protruding out of one side of the transfer plate, of the transparent electrode layer 112 is d2 a width, protruding out of the other side of the transfer plate, of the transparent electrode layer 112 is d3, and d1=d4>d2=d3.

As shown in FIG. 4, in one embodiment, the insulating layer is arranged between the first signal line and the transparent electrode layer 112, and the transparent electrode layer 112 corresponding to the area of the common line 113 is directly attached to the transfer plate 114. In the solution, the transparent electrode layer 112 corresponding to the area of the common line 113 is directly attached to the transfer plate 114, so that direct connection between the transparent electrode layer 112 and the common line 113 is achieved, and reliability of signal transmission is good. In addition, the transparent electrode layer 112 corresponding to the area of the first signal line 116 is provided with two insulating layers 117, the transparent electrode layer 112 corresponding to the area of the common line 113 is not provided with the insulating layer 117, and is in direct contact, due to the fact that the signal of the area of the common line 113 is the same as the signal of the transparent electrode layer 112, the signals are the same and have no influences, it is also acceptable that the insulating layer 117 is not arranged, and use of a material is reduced.

Of course, the transparent electrode layer 112 corresponding to the area of the common line 113 may also be arranged on the insulating layer 117, the insulating layer 117 may be the first insulating layer 118 or the passivation layer 119, or is provided with the first insulating layer 118 and the passivation layer 119 at the same time, and the arrangement may also achieve an effect of connection of the transparent electrode layer 112 and the common line 113.

Figure 5:
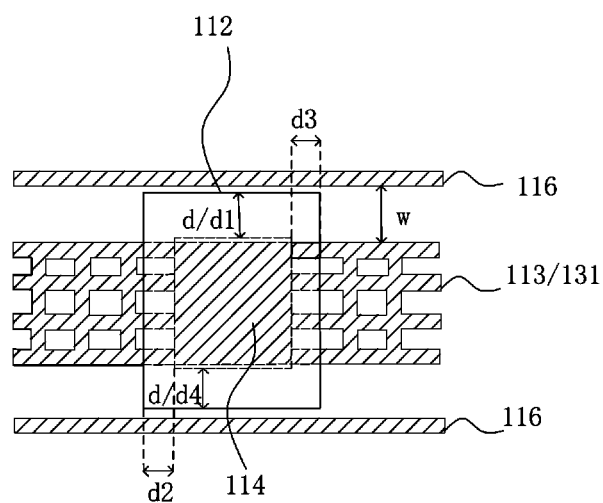
FIG. 5 is a schematic view of a top view of a first metal layer according to another embodiment of this application.

A width of the transparent electrode layer 112 (ITO) extending in a same signal direction is greater than a width of the transparent electrode layer 112 extending in different signal directions. As shown in FIG. 5, in one embodiment, the first metal layer 115 includes a common line 113 and a first signal line 116, the common line 113 and the first signal line 116 transmit different signals, the transparent electrode layer 112 does not cover an area corresponding to the first signal line 116, in a direction from the common line to the first signal line, a width, protruding out of the transfer plate, of the transparent electrode layer 112 is d, an interval between the first signal line and the common line is w, and w<d. If there is an overlapping area between the different signals, capacitive coupling exists, and capacitive coupling results in distortion of transmitted signals.

In the solution, the interval w between the first signal line and the common line is set to be less than the width, protruding out of the transfer plate, of the transparent electrode layer 112, so that the transparent electrode layer 112 does not cover the area corresponding to the first signal line 116. The transparent electrode layer 112 is connected to the transfer plate 114 of the common line 113, signals transmitted by the common line 113 and the first signal line 116 are different, and therefore signals of the transparent electrode layer 112 and the first signal line 116 are different. The transparent electrode layer 112 and the area corresponding to the first signal line do not overlap with each other, capacitive coupling is avoided, and then mutual influences between the signals are reduced.

Figure 6:
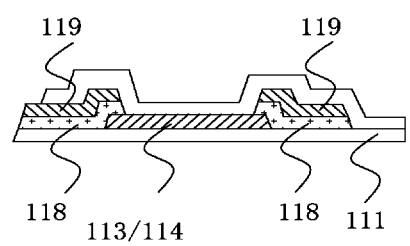
FIG. 6 is a schematic view of a sectional view of the first metal layer according to another embodiment of this application.

As shown in FIG. 5 and FIG. 6, in one embodiment, in the direction from the common line to the first signal line, a width, protruding out of one side of the transfer plate, of the transparent electrode layer 112 is d1, and a width, protruding out of the other side of the transfer plate, of the transparent electrode layer 112 is d4; and in a direction perpendicular to the direction from the common line to the first signal line, a width, protruding out of one side of the transfer plate, of the transparent electrode layer 112 is d2, a width, protruding out of the other side of the transfer plate, of the transparent electrode layer 112 is d3, and d1=d4<d2=d3.

In the solution, a width of the transparent electrode layer 112 extending in a same signal transmission direction is d1, a width of the transparent electrode layer 112 extending between different signal directions is d2, d1<d2, the transparent electrode layer 112 extends all around, a covering area of the transparent electrode layer 112 is widened, when various errors exist, connection of the AU ball 130 is not affected, and quality of the display panel 100 is guaranteed; in addition, d1<d2, the transparent electrode layer 112 does not overlap with the area corresponding to the first signal line, capacitive coupling is avoided, and then mutual influences between signals are reduced.

Due to the fact that errors exist in a process manufacture procedure, for example, an error exists when a first substrate 110 and a second substrate 120 are opposed and aligned, and is called an assemblage error x; a range of a value of x is 0≤x<10 µm, an error may exist during AU ball coating, and is called a coating error y, and a range of a value of y is 0≤y<500 µm; meanwhile, other errors still exist, and are called other errors z, a range of a value of z is 0≤z<100 µm, ranges of values of d1, d2, d3 and d4 are: d1>x+y+z; d2>x+y+z; d3>x+y+z; and d4>x+y+z, and thus 0≤d1<610 µm, 0≤d3<610 µm, and 0≤d4<610 µm.

Figure 7:
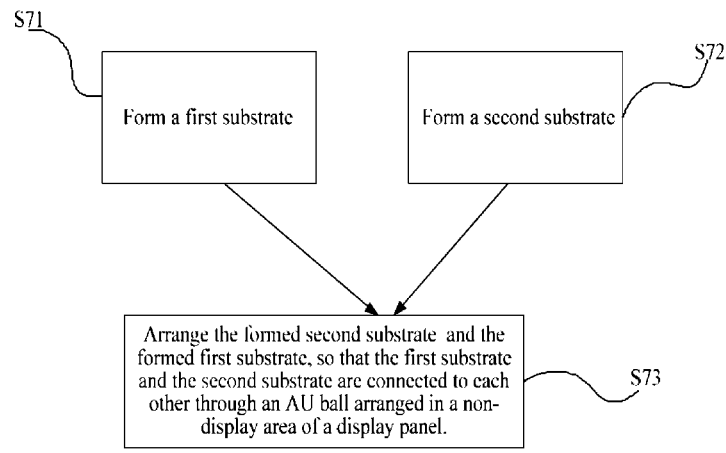
FIG. 7 is a flow schematic view of a manufacturing method of the display panel according to an embodiment of this application.
Figure 8:
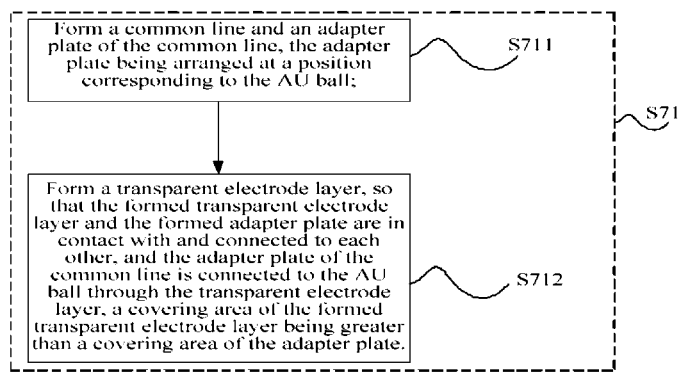
FIG. 8 is a flow schematic view of a manufacturing method of a first substrate according to an embodiment of this application.

As shown in FIG. 7 and FIG. 8, in one or more embodiment, a manufacturing method of the display panel 100 is disclosed, and includes following steps:

S71: forming a first substrate;

S72: forming a second substrate, where a common electrode 121 is formed on the second substrate 120; and S73: arranging the formed second substrate 120 and the formed first substrate 110 oppositely, so that the first substrate 110 and the second substrate 120 are connected to each other through an AU ball 130 arranged in a non-display area of the display panel 100.

The step of forming the first substrate 110 in S71 includes following steps:

S711: forming a common line 113 and a transfer plate 114 of the common line 113, the transfer plate 114 being arranged at a position corresponding to the AU ball 130; and S712: forming a transparent electrode layer 112, so that the formed transparent electrode layer 112 and the formed transfer plate 114 are in contact with and connected to each other, and the transfer plate 114 of the common line 113 is connected to the AU ball 130 through the transparent electrode layer 112, a covering area of the formed transparent electrode layer 112 being greater than a covering area of the transfer plate 114.

Figure 9:
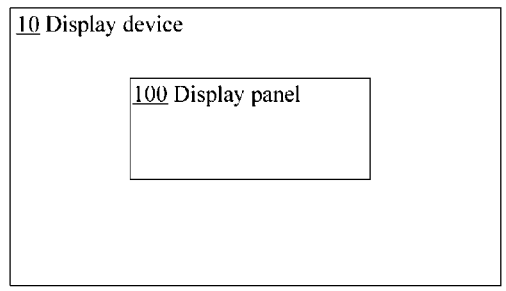
FIG. 9 is a block diagram schematic view of a display device according to an embodiment of this application.

As shown in FIG. 9, in one or more embodiment, a display device 10 is disclosed, and includes the above display panel 100.

Figure 10:
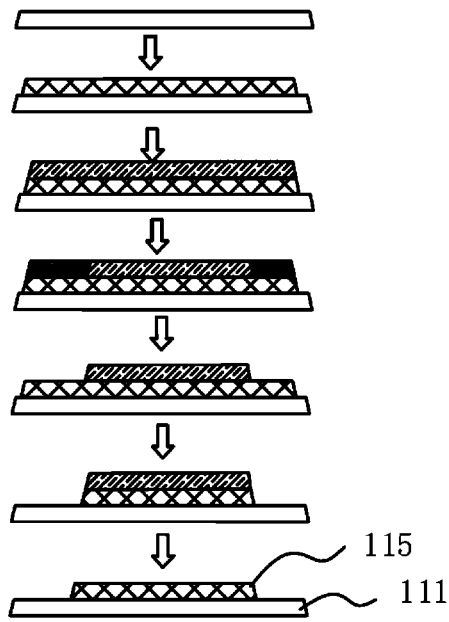
FIG. 10 is a process flow schematic view of the first metal layer according to an embodiment of this application.
Figure 11:
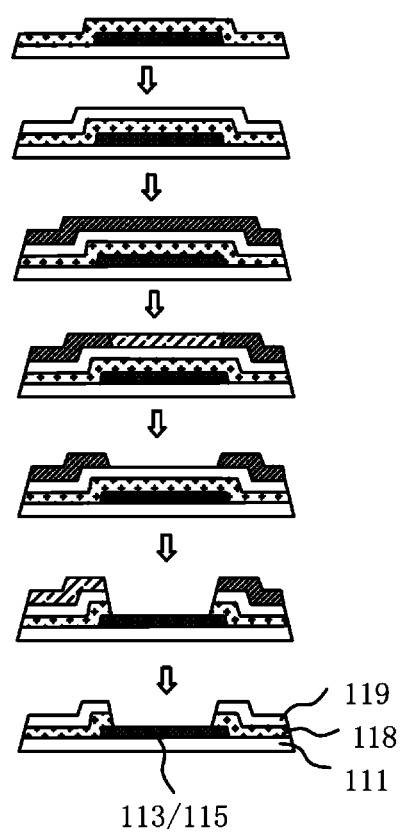
FIG. 11 is a process flow schematic view of an insulating layer and a passivation layer according to an embodiment of this application.
Figure 12:
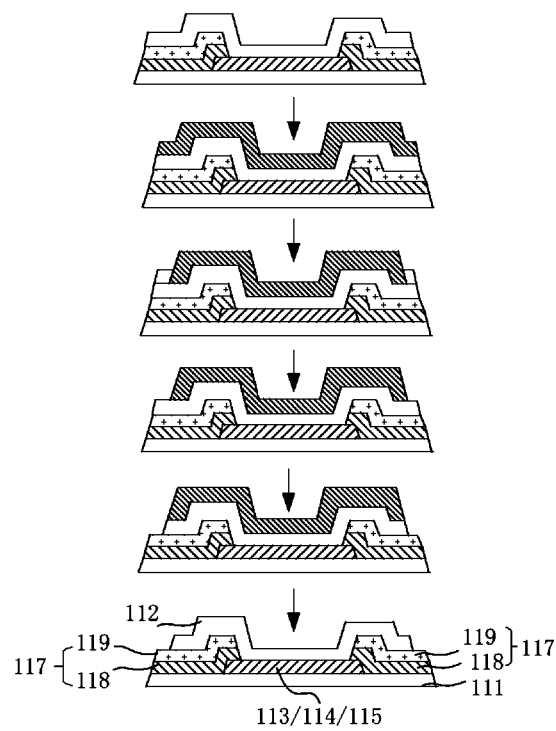
FIG. 12 is a process flow schematic view of a transparent electrode layer according to an embodiment of this application.

As shown in FIG. 10, FIG. 11 and FIG. 12, in one or more embodiment, a display panel 100 is disclosed, and is divided into a display area and a non-display area, and the display panel includes: a first substrate 110, a second substrate 120 arranged opposite to the first substrate 110, and an AU ball 130; the first substrate 110 is an array substrate, the second substrate 120 is a CF substrate, and the array substrate and the CF sub substrate are in connection through the AU ball. The array substrate includes a common line 113, a first signal line and a transparent electrode layer 112; the common line includes a transfer plate, and a signal of the common line is different from that of the first signal line. A covering area of the transparent electrode layer 112 is greater than a covering area of the transfer plate. In a direction from the common line to the first signal line, a width, protruding out of one side of the transfer plate, of the transparent electrode layer 112 is d1, and a width, protruding out of the other side of the transfer plate, of the transparent electrode layer 112 is d4; and in a direction perpendicular to the direction from the common line to the first signal line, a width, protruding out of one side of the transfer plate, of the transparent electrode layer 112 is d2, a width, protruding out of the other side of the transfer plate, of the transparent electrode layer 112 is d3, and d1=d4<d2=d3. A first insulating layer and a passivation layer 119 are arranged between the first signal line and the transparent electrode layer 112, and at a position corresponding to the AU ball, the first insulating layer and the passivation layer 119 are arranged between the common line and the transparent electrode layer 112.

The CF substrate includes a common electrode, the transparent electrode layer 112 and the transfer plate are in contact with and connected to each other, the transfer plate is connected to the AU ball through the transparent electrode layer 112, and the common line of the array substrate and the common electrode of the CF substrate are connected to each other through the AU ball.

A manufacturing method of the display panel 100 includes:

a step of forming the array substrate; and a step of forming the CF substrate, where the step of forming the CF substrate includes forming the common electrode 121 at the same time; and steps of cell forming, i.e., arranging the formed array substrate and the formed CF substrate oppositely, so that the array substrate and the CF substrate are connected to each other through the AU ball 130 arranged in the non-display area of the display panel 100.

The step of forming the array substrate includes the following steps:

Plating a layer of metal material on a glass substrate 111, then coating with a photoresist, performing exposure, development and wet etching, then removing the photoresist, and forming the common line 113 and a first signal line of a first metal layer 115 and the transfer plate 114 of the common line at the same time; plating a GI layer and a PV layer on the formed first metal layer 115, then coating with a photoresist, performing exposure, development and dry etching, then removing the photoresist, and forming the first insulating layer 118 and the passivation layer 119 through a same mask manufacture procedure; and plating an ITO layer on the formed passivation layer 119, then coating photoresist, performing exposure, development and wet etching, then removing the photoresist, and forming the transparent electrode layer 112.

A covering area of the formed transparent electrode layer 112 is greater than a covering area of the formed transfer plate. A width, protruding out of one side of the formed transfer plate, of the formed transparent electrode layer 112 is d1, and a width, protruding out of the other side of the transfer plate, of the transparent electrode layer 112 is d4; in a direction perpendicular to a direction from the common line to the first signal line, a width, protruding out of one side of the formed transfer plate, of the formed transparent electrode layer 112 is d2, a width, protruding out of the other side of the transfer plate, of the transparent electrode layer 112 is d3, and d1=d4<d2=d3. The formed transparent electrode layer 112 and the formed transfer plate are in contact with and connected to each other, the formed transfer plate is connected to the AU ball through the formed transparent electrode layer 112, and the common line of the array substrate and the common electrode of the CF substrate are connected to each other through the AU ball. The formed transfer plate 114 is connected to the transparent electrode layer 112.

In the solution, as the covering area of the transparent electrode layer 112 is increased, when the assemblage error, the AU ball 130 error or other errors exist, an area, which can be in contact with the AU ball 130, of the transparent electrode layer 112 is increased, and therefore connection of the common line 113 of the array substrate and the common electrode 121 of the CF substrate is not affected.

It should be noted that the sequence numbers of steps involved in a specific solution should not be considered as limiting the order of steps as long as the implementation of this solution is not affected. The steps appearing earlier may be executed earlier than, later than, or at the same time as those appearing later. Such implementations shall all be considered as falling within the protection scope of this application as long as this solution can be implemented.

The technical solutions of this application can be widely applied to various display panels, such as twisted nematic (TN) panels, in-plane switching (IPS) panels, vertical alignment (VA) panels, and multi-domain vertical alignment (MVA) panels. Certainly, other types of display panels are also applicable to the above solutions.

The foregoing content is merely detailed descriptions of this application made with reference to specific optional implementations, and should not be considered limiting of specific implementations of this application. Persons of ordinary skill in the art can further make simple deductions or replacements without departing from the concept of this application, and such deductions or replacements should all be considered as falling within the protection scope of this application.

What is claimed is:

1. A display panel, divided into a display area and a non-display area, and the display panel comprising:
   a first substrate;
   a second substrate, arranged opposite to the first substrate; and
   an AU ball, arranged between the first substrate and the second substrate;
   wherein the first substrate comprises a transparent electrode layer and a common line, and the second substrate comprises a common electrode;
   the AU ball is arranged in the non-display area of the display panel, and the common line and the common electrode are connected to each other through the AU ball; and
   the common line comprises a transfer plate, the transfer plate is arranged at a position corresponding to the AU ball, the transparent electrode layer and the transfer plate are in contact with and connected to each other, the transfer plate is connected to the AU ball through the transparent electrode layer, and a covering area of the transparent electrode layer is greater than a covering area of the transfer plate;
   wherein the common line comprises a common line wire, the common line wire is hollow in a latticed shape, the common line wire communicates with the transfer plate, and the transparent electrode layer covers the transfer plate and partially covers the common line wire on a periphery of the transfer plate.

2. The display panel according to claim 1, wherein the first substrate comprises a first metal layer, and the first metal layer and the common line are formed in a same layer.

3. The display panel according to claim 1, wherein the first substrate comprises a second metal layer, and the second metal layer and the common line are formed in a same layer.

4. The display panel according to claim 1, wherein the first substrate is provided with a first signal line, a signal of the common line is different from that of the first signal line, and the transparent electrode layer covers an area corresponding to the first signal line; and
   the first substrate is further provided with an insulating layer, and the insulating layer is arranged between the first signal line and the transparent electrode layer.

5. The display panel according to claim 4, wherein the common line of the first substrate is formed on the first metal layer of the first substrate, the insulating layer comprises a first insulating layer and a passivation layer, the first insulating layer is arranged on the first metal layer, and the passivation layer is arranged on the first insulating layer.

6. The display panel according to claim 4, wherein the common line of the first substrate is formed on the first metal layer of the first substrate, the insulating layer comprises a first insulating layer, and the first insulating layer is arranged on the first metal layer.

7. The display panel according to claim 4, wherein the common line of the first substrate is formed on the first metal layer of the first substrate, the insulating layer comprises a passivation layer, and the passivation layer is arranged on the first metal layer.

8. The display panel according to claim 5, wherein at the position corresponding to the AU ball, the first insulating layer and the passivation layer form a same pattern shape through a same mask manufacture procedure.

9. The display panel according to claim 5, wherein at the position corresponding to the AU ball, the first insulating layer and the passivation layer form a same pattern shape through different mask manufacture procedures.

10. The display panel according to claim 4, wherein the insulating layer is arranged between the first signal line and the transparent electrode layer, and the transparent electrode layer corresponding to a common line area is directly attached to the transfer plate.

11. The display panel according to claim 1, wherein the first substrate comprises a first metal layer, the first metal layer comprises a common line and a first signal line, the common line and the first signal line transmit different signals, the transparent electrode layer does not cover an area corresponding to the first signal line, in a direction from the common line to the first signal line, a width, protruding out of the transfer plate, of the transparent electrode layer is d, an interval between the first signal line and the common line is w, and w<d.

12. The display panel according to claim 11, wherein in the direction from the common line to the first signal line, a width, protruding out of one side of the transfer plate, of the transparent electrode layer is d1, and a width, protruding out of the other side of the transfer plate, of the transparent electrode layer is d4; and in a direction perpendicular to the direction from the common line to the first signal line, a width, protruding out of one side of the transfer plate, of the transparent electrode layer is d2, a width, protruding out of the other side of the transfer plate, of the transparent electrode layer is d3, and d1=d4<d2=d3.

13. The display panel according to claim 12, wherein 0<d1<610 microns, 0<d2<610 microns, 0<d3<610 microns, and 0<d4<610 microns.

14. A manufacturing method of a display panel, comprising the following steps:
   a step of forming a first substrate;
   a step of forming a second substrate, wherein a common electrode is formed on the second substrate; and
   a step of arranging the formed second substrate and the formed first substrate in an opposed manner, so that the first substrate and the second substrate are connected to each other through an AU ball arranged in a non-display area of the display panel;
   wherein the step of forming the first substrate comprises the following steps:
   forming a common line and a transfer plate of the common line, the transfer plate being arranged at a position corresponding to the AU ball; and
   forming a transparent electrode layer, so that the formed transparent electrode layer and the formed transfer plate are in contact with and connected to each other, and the transfer plate of the common line is connected to the AU ball through the transparent electrode layer, a covering area of the formed transparent electrode layer being greater than a covering area of the transfer plate;

wherein the common line comprises a common line wire, the common line wire is hollow in a latticed shape, the common line wire communicates with the transfer plate, and the transparent electrode layer covers the transfer plate and partially covers the common line wire on a periphery of the transfer plate.

15. A display device, comprising a display panel, and the display panel comprising:

a first substrate;

a second substrate, arranged opposite to the first substrate; and an AU ball, arranged between the first substrate and the second substrate;

wherein, the first substrate comprises a transparent electrode layer and a common line, and the second substrate comprises a common electrode;

the AU ball is arranged in a non-display area of the display panel, and the common line and the common electrode are connected to each other through the AU ball;

the common line comprises a transfer plate, the transfer plate is arranged at a position corresponding to the AU ball, the transparent electrode layer and the transfer plate are in contact with and connected to each other, the transfer plate is connected to the AU ball through the transparent electrode layer, and a covering area of the transparent electrode layer is greater than a covering area of the transfer plate;

wherein the common line comprises a common line wire, the common line wire is hollow in a latticed shape, the common line wire communicates with the transfer plate, and the transparent electrode layer covers the transfer plate and partially covers the common line wire on a periphery of the transfer plate.

* * * * *